United States Patent [19]

Cofield

[11] Patent Number: 4,942,758

[45] Date of Patent: Jul. 24, 1990

[54] HIGH SPEED LEAK TESTER

[76] Inventor: Dennis H. Cofield, 2817 Roy Pace, El Paso, Tex. 79935

[21] Appl. No.: 937,887

[22] Filed: Dec. 4, 1986

[51] Int. Cl.$^5$ ............................................. G01M 3/26
[52] U.S. Cl. ..................................... 73/49.2; 364/510
[58] Field of Search ........................... 73/49.2, 40, 37; 365/509, 510, 558, 564; 340/605

[56] References Cited

U.S. PATENT DOCUMENTS

| | | | |
|---|---|---|---|
| Re. 26,661 | 9/1969 | Fitzpatrick et al. | 73/40 |
| 2,939,314 | 12/1956 | Prince | 73/40 |
| 3,304,546 | 2/1967 | Kern et al. | 73/40.5 R X |
| 3,457,775 | 7/1969 | Hinderer et al. | 73/40 |
| 3,691,821 | 9/1972 | Davey | 73/49.2 |
| 3,793,876 | 2/1974 | Oswald | 73/49.2 |
| 3,872,712 | 3/1975 | Westervelt et al. | 73/40 |
| 3,878,376 | 4/1975 | Sholes, Jr. et al. | 364/509 |
| 3,893,332 | 7/1975 | Dolan et al. | 73/49.2 |
| 3,918,291 | 11/1975 | Pauly et al. | 73/49.2 |
| 3,931,731 | 1/1976 | Fukuda | 73/40 |
| 4,078,421 | 3/1978 | Gastaldo et al. | 73/49.2 |
| 4,099,404 | 7/1978 | Eberle | 73/49.2 |
| 4,350,038 | 9/1982 | Soncrant | 73/49.2 |
| 4,364,261 | 12/1982 | Askwith et al. | 73/49.2 |
| 4,523,452 | 6/1985 | Brayman | 73/49.2 |
| 4,575,807 | 3/1986 | Dodge | 364/510 |
| 4,670,847 | 6/1987 | Furuse | 73/49.2 |

OTHER PUBLICATIONS

A schematic drawing of a prior test model non-computerized leak tester which was made by applicant and shipped to a customer in the United States more than one year prior to the filing of this Application.

*Primary Examiner*—Hezron E. Williams
*Attorney, Agent, or Firm*—John W. Montgomery

[57] ABSTRACT

A computerized leak tester system for rapidly testing a work piece for fluid leaks comprising a continuously regulated pressure supply, a coupler for connecting the pressure supply to a work piece through a valve such that the work piece is both pressurized and tested for leaks through the valve. A differential pressure transducer is connected across the valve for producing a signal in response to a differential pressure detected across the valve. A signal conversion means is provided for receiving the signal from the differential pressure transducer and for converting it into a computer readable signal. A computer is provided for receiving the computer readable signal which represents differential pressure value and for converting the differential pressure valve into a current flow rate value. Circuitry is provided in the computer for comparing the current flow rate to a predetermined flow rate value representing a maximum allowable leak rate.

12 Claims, 2 Drawing Sheets

HIGH SPEED LEAK TESTER

BACKGROUND OF THE INVENTION

The present invention relates to a high speed leak tester for testing the fluid tightness of a large number of test pieces or work pieces in rapid succession. The leak tester is adapted also for testing for a desired flow rate through a large number of test pieces in rapid succession. In particular the present invention relates to a computerized leak tester which employs a digital computer to measure, display and record the leak test parameters and results.

The need for such high speed leak testers exist, for example, in connection with automatic assembly lines. Prior art attempts to provide high speed leak testers such as U.S. Pat. No. 3,465,562 pressurize the work piece, seal it, and measure the decay of pressure over a timed period. This process has proven unsuccessful where extremely high speed is required. The component under test must be charged with air or another fluid by the opening of a valve, the valve is then closed to stop the charge and to seal the component under test, then the pressure must be allowed to stabilize, and after the stabilization period the pressure is measured and a timer is started. After the timer runs a certain length of time the pressure in the component under test is again measured to determine if the component has unacceptably permitted the pressure to leak therefrom.

In many assembly lines the component parts move very rapidly and the test must be completed within a fraction of a second and sometimes on the order of milliseconds.

Another device for measuring leakage flow is disclosed in U.S. Pat. No. 3,872,712 issued to Westerfelt et al. In the system disclosed by Westerfelt et al., one fluid circuit is used to rapidly fill the work piece with pressurized air then this circuit is closed and a test circuit is opened which includes a cross flow metering valve specifically designed for laminar flow in the range of pressure anticipated as a result of an unacceptable leak. As the laminar flow metering valve is designed for small flow volumes it becomes necessary to have two separate circuits; one for filling the work piece and one for testing the work piece. This system is not acceptable when the test must be completed within a fraction of a second or within milliseconds because the opening and closing of the valves for the separate circuits and the time delay required for stabilization after the fill valve is closed and then again after the test valve is opened is too long.

Also, the foregoing test apparatuses are not well suited for testing for a required level of continuous flow. For example, a test piece may have a small orifice intentionally formed therein, which orifice will have a particular flow rate if it is formed properly. If, for example, flashing remained in such an orifice, this defective condition could be checked using a flow rate tester. The fill and decay type leak testers would not normally be useable for such testing because the "good" parts by design do not hold a charge and thus do not become filled so that measuring the decay of the charge is not a suitable testing procedure.

SUMMARY OF THE INVENTION

An object of the present invention is to provide a computerized leak tester system for rapidly testing a work piece for fluid leaks or alternatively for a desired flow rate. The leak tester comprises a continuously regulated pressure supply, means for coupling the pressure supply to a work piece through a valve such that the work piece is both pressurized and tested through said valve. A differential pressure transducer is connected across the valve for producing a signal in response to differential pressure created across the valve by flow therethrough. A signal conversion means is provided for receiving the signal from the differential pressure transducer and for converting it into a computer readable signal. A computer is provided for receiving the computer readable signal which represents the differential pressure value across the valve and for converting the differential pressure value into a flow rate. Circuitry is provided in the computer for comparing the flow rate to a predetermined flow rate value representing a maximum allowable leak rate.

It is also an object of the present invention to provide a leak tester which could be used to test for a minimum flow rate through a test piece.

Another object of the present invention is to provide computerized controls to continuously maintain the pressure supply at a particular pressure within a tight tolerance of pressures. The computerized control allows the supply tank pressure to be stabilized rapidly during testing.

It is a further object of the present invention to provide computer circuitry for accepting input tolerance parameters from a keyboard, for comparing the input parameters to the measured parameters, for displaying the input and measured parameters as well as the test results.

It is a further object of the present invention to provide a computerized circuitry and memory storage areas for continuously recording the test results of each of the assembly line work pieces tested such that quality control can be maintained.

BRIEF DESCRIPTION OF THE DRAWINGS

These and other objects and advantages of the present invention will be disclosed in conjunction with the accompanying drawings in which like elements are designated by like numbers and in which.

DETAILED DESCRIPTION OF THE DRAWINGS

The instant invention is applicable and useful for a wide variety of work pieces to be tested for leaks or for a desired flow rate therethrough. The invention is particularly useful in conjunction with components traveling along in assembly line prior to installation into a final product. Examples of such work pieces include components of aerosol spray cans and/or plastic trigger pumps, and/or spray nozzle orifices. For convenience, without any intention to limit the invention to that use, the construction, use, and operation of the invention will occasionally be described in connection with examples of such work pieces.

Figure 1:
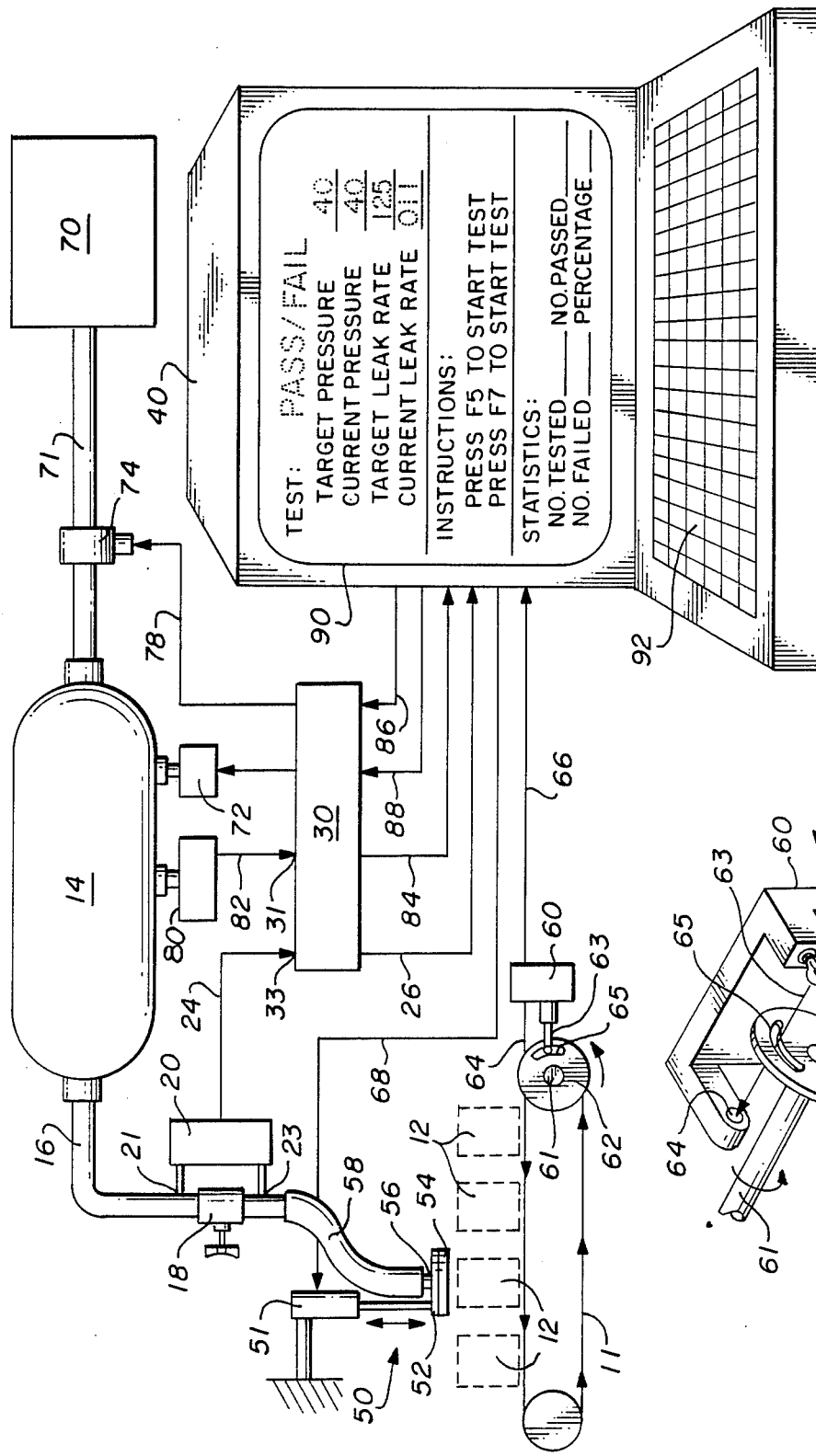
FIG. 1 is a schematic representation of the inventive leak tester.

Referring now to the drawings, FIG. 1 is a schematic view of the inventive leak tester. A supply tank 14 is provided with computer operated means 72 and 74 for maintaining therein a constant pressure. A high pressure source 70 is connected to tank 14 through conduit 71 in which a signal operated valve 74 is interposed. The signal operated valve 74 may be a rapid acting solenoid type valve capable of rapid action in response to a signal 78, which signal may be produced using computer controls. When valve 74 is open high pressure air enters supply tank 14.

The pressure in supply tank 14 is continuously monitored using a first pressure transducer 80. Pressure transducer 80 may be of any known type of pressure measuring device which produces an analog signal 82 representing the pressure in tank 14. The first analog signal 82 is received at means 31 of analog to digital conversion means 30. There it is converted into a first computer readable signal 84 such as a digital signal 84 which is transmitted to computer 40 which may be any of a number of computers such as personal computers. Applicant has found that an eight bit digital computer system such as a standard personel computer is useful for the purposes of this invention.

Figure 2:
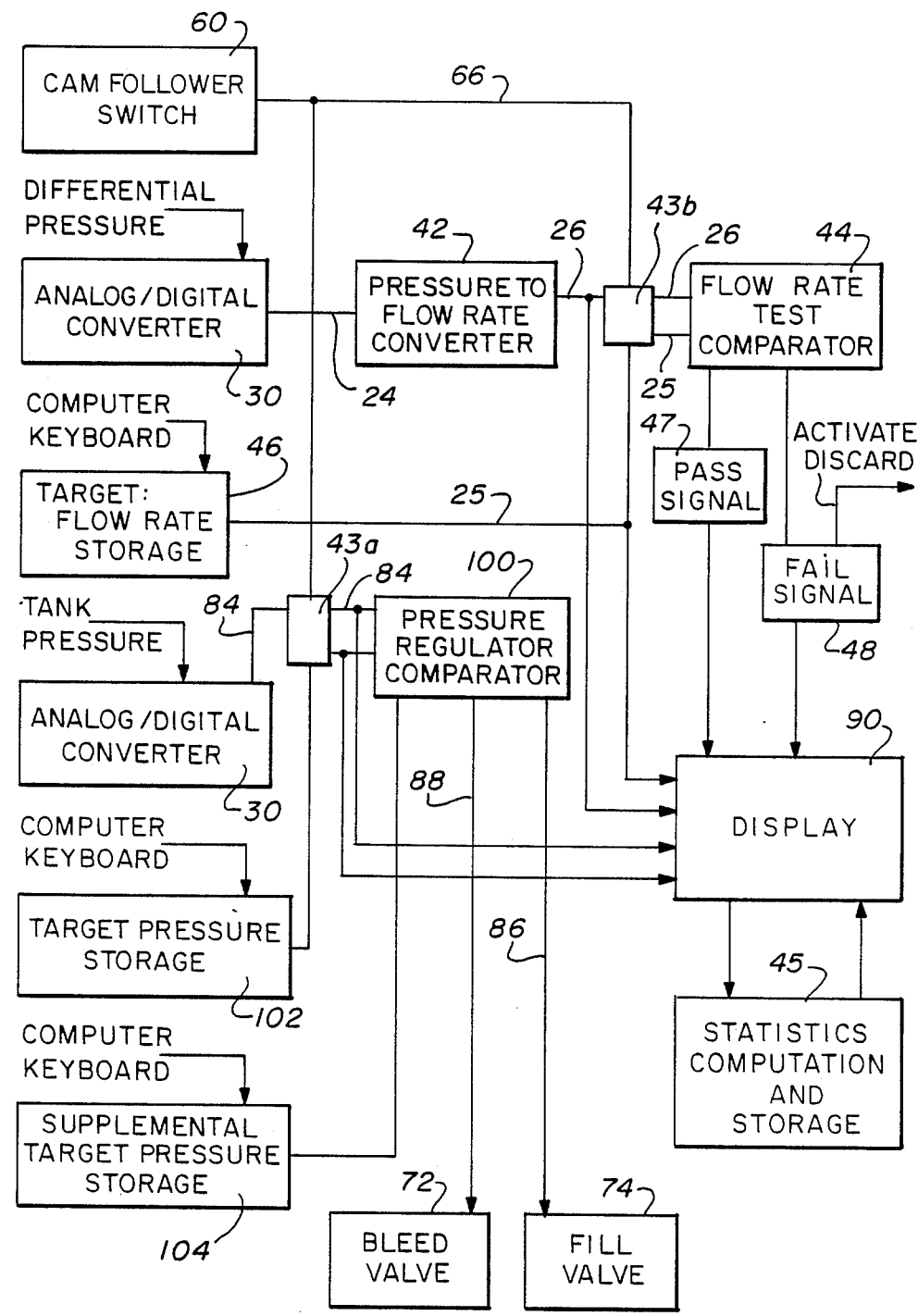
FIG. 2 is a block diagram of the novel leak tester computer circuitry.

FIG. 2 is a schematic view of one embodiment of the invention in which such computer circuitry is used. The schematic circuitry in computer 40 is designated appropriately to show the interfacing with other components of the invention. Signal 84 is received into a comparator device 100 which also receives a signal from a computer storage area 102 which represents a target pressure. In a preferred embodiment, as indicated in FIG. 2, this informational storage area may be entered through a computer keyboard, such as keyboard 92 of FIG. 1. Any of a number of standard computer storage devices such as tapes, discs or chips may be used. The target pressure may be represented by a range of pressures designated by a maximum and a minimum pressure. Alternatively, a single target pressure may be established and a tolerance of permissible pressures may be stored within the storage area 102. The signal from the storage area is compared in comparator 100 to the signal 84 which is generated as discussed above to represent the pressure in tank 14. When the pressure falls below the minimum target pressure or below the permissible variance in the target pressure, a computer signal 86, such as a digital signal 86, is produced for opening the solenoid valve 74 directly as shown schematically in FIG. 2.

Alternatively, as shown in FIG. 1, computer signal 86 is converted in converter 30 into a signal, such as an analog signal 78, which opens the solenoid valve 74. When the pressure increases beyond the maximum permissible target pressure or goes outside the permissible tolerance then the signal 86 is appropriately changed so that it is converted signal 78 which closes valve 74. It will be understood that in either case the appropriate signal to open or to close valve 74 may be the absence of a signal depending upon the bias position of valve 74.

It will further be understood that while in the preferred embodiment depicted in FIG. 1, a single converter 30 is used to convert all the input/output signals from analog to digital signals or from digital to analog signals, multiple converters could be used such that any one or more of the signals could be converted by a separate converter 30 as depicted schematically in FIG. 2. Preferably even FIG. 2 may be interpreted as each converter 30 representing the same converter 30.

Further, for the purpose of "fine tuning" the pressure within tank 14 a bleed valve 72 is provided which may either act upon the same signal generated by the comparator 100 based upon signal 84 compared to the signal from memory 102. However, in the preferred embodiment signal 84 is also compared to signal from computer storage area 104 which provides a closer tolerance than that achievable with a solenoid valve 74 such that bleed valve 72 is operated to relieve peak pressures in tank 14 in accordance with the specific maximum target pressure stored in storage 104. In the embodiment shown in FIG. 2 a separate signal 88 from computer 40 opens relief valve 72 when the pressure exceeds a maximum value and closes valve 72 immediately upon falling below such maximum value.

In the embodiment depicted in FIG. 1 signal 88 from comparator 100 would be converted in converter 30 to a signal 76, such as an analog signal 76, which opens relief valve 72 when the pressure exceeds such maximum value and closes valve 72 immediately upon falling below such maximum value. By this computer operated system the pressure in tank 14 has been found to be continuously regulateable to within an acceptable variation in pressures for the purposes of this invention. For example, any target pressure between 0 and 5 psi may be maintained within a range of about 0.02 psi above the target pressure and 0.02 psi below the target pressure.

Again with reference to FIG. 1 the inventive leak tester has a single conduit 16 providing a fluid passageway from tank 14 to work piece 12. Interposed in conduit 16 is valve 18 which is preferably an adjustable valve 18 and through which the fluid flows to work piece 12. Typically the work piece 12 shown with dashed lines is not part of the leak tester itself. Typically the work piece 12 will be periodically moved by a portion 11 of a given assembly line for which applicant's invention is useful. For example, portion 11 of a given assembly line may be a conveyor belt (as depicted in FIG. 1), a rotating table, a mechanical means, or any other means for positioning the work piece adjacent connector 50 might be used in any given assembly line. Connector 50 operates to sealingly connect with work piece 12. In a preferred embodiment, connector 50 comprises a rigid plate or cup 52 which may be constructed of plastic or metal or another durable material. It is formed into a shape corresponding to the shape of the surface of the work piece against which a seal must be completed. A resilient gasket 54 such as a rubber gasket 54 may be provided to ensure sealing engagement. A fitting such as a durable rigid plastic or metallic fitting is sealingly fastened to the plate 52 and a flexible connector hose 58 completes the fluid communication path of conduit 16 to the work piece 12. The flexible hose 58 may be made of surgical rubber hose or other suitable flexible hose which is preferably resistant to fatigue and other deteriorating mechanisms caused by repeated flexture of the hose. The total distance from the interposed valve 18 to the work piece 12 is kept short and preferably is maintained at a minimum and preferably less than four inches (10.16 centimeters) so that charging times and stabilization periods are sufficiently small according to the present invention to provide rapid leak testing.

In the preferred embodiment pressurized fluid flows continuously through conduit 16 and valve 18 except when such flow is interrupted by sealingly connecting plate 52 against work piece 12. For example, depending upon the assembly line or apparatus for which this invention is used, the connection may be accomplished by mechanically, hydraulically or electromechanically moving plate 52 down onto work piece 12 when it is in an appropriate position on an assembly line, conveyor belt, or rotating plate. This action may be timed by means 60 which is synchronized with the position of the work piece along the assembly line.

Figure 3:
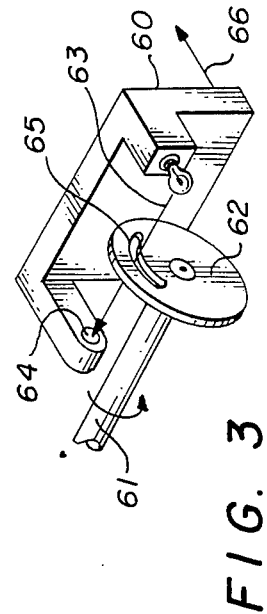
FIG. 3 is a perspective view of an embodiment of a work piece position detector means of the invention.

In the preferred embodiment, as shown in FIG. 3, sensor means 60 is a photoelectric switch comprising an adjustable timing plate 62 which indicates the work piece position by permiting a light beam 63 to be detected at photocell 64. Other means for rapidly sensing the position of work piece 12 such as sufficiently rapid mechanical means, optical means, other photoelectric means, electrical sensor means, magnetic means or the like may be used to sense the position of work piece 12 in alignment with work piece connector means 50. The signal from position detector means 60 may go directly to a device 51, for moving connector 50 into and out of sealing engagement with work piece 12. Device 51 is typically a specially adapted portion of a given assembly line for which applicant's invention is useful. In a preferred embodiment the signal from 60 is received in the computer which transmits the appropriate operating signal 68 to operate device 51 depending upon the value of the position signal 66 received by the computer. With this arrangement, timing adjustments may be made by varying the position of an orifice 65 in plate 62 with respect to shaft 61 of the assembly line, which shaft 61 has a rotary position directly related to the position of test pieces 12. Alternatively, timing adjustments may be made using computer storage and circuitry which may be adjusted through operator entries through the computer keyboard 92.

The signal 66 from sensor means 60 may further be operated by the computer circuitry to activate the pressure differential measuring and comparison circuitry at an appropriate time delay period after device 51 is activated to sealingly connect conduit 16 to the workpiece through connector means 50. Thus, there is fluid flow continuously through valve 18 when the connector is not in place on a work piece. However, the differential pressure drop across valve 18 need not be monitored except when a leak test is being performed and connector 50 is sealingly engaged with work piece 12.

Depending upon the volume of the work piece and the permissible leak rate or the required minimum and maximum flow rate which must be detected in order to determine if the part is impermissibly leaking or if an opening therein is sufficiently clear, adjustable valve 18 is adjusted so that the size of the orifice or opening through valve 18 permits sufficient flow to rapidly charge the work piece. At the same time the size of the orifice or opening through valve 18 must be sufficiently restrictive to create a measurable differential pressure drop across the valve. Prior to operating the leak tester device, a set up procedure is performed during which standard volumes having standard leak rates are used to accomplish the adjustment of adjustable valve 18 to maximize the testing speed while maintaining sufficient accuracy. Thus, the inventive and advantageous use of adjustable valve 18 provides the operator with the unique and unobvious result of being able to minimize the testing time and thus maximize the productivity of the leak tester.

In the preferred embodiment adjustable valve 18 is a standard pitcock valve, the size of which, as discussed above, is dependent upon the size of or the required flow rate through the test piece 12. It has been found that capillary tubes or other laminar flow devices are not required for applicant's invention.

To detect the differential pressure across valve 18, a second pressure transducer 20, which is a differential pressure transducer 20, is connected at 21 upstream from valve 18 and at 23 downstream from valve 18. Transducer 20 may be any known transducer and in the preferred embodiment applicant has found that a transducer which produces an analog electrical signal proportion to the pressure differential is useful.

Such a transducer will produce an analog signal 24 which represents the differential pressure across valve 18. In the preferred embodiment using a transducer as described above an electrical analog output is generated substantially proportional to the pressure differential across valve 18. The analog signal 24 may be an electrical signal 24. It is received at receiving means 33 of the analog to digital converter 30. Converter 30 produces a computer readable signal 26, and in the case of using a digital computer, a digital signal 26, which corresponds to the pressure differential detected. The digital signal 26 corresponds to the pressure differential and may be converted by computer circuitry into a corresponding leak rate. A conversion formula for any given valve 18 can be advantageously input as through a keyboard into a digital computer storage area. Preferably the correlation between the resulting leak rate values as determined by the conversion formula placed in the computer can be checked using calibration techniques such as standard volumes with standard leak rates. Alternatively, where excessive keyboard operations are undesirable multipliers may be used such that the analog signal is modified to produce the machine readable digital signal 26 corresponding to the actual leak rate. Such multipliers may, for example, be included in the analog to digital converter 30. It will be understood that a signal 24 is substantially continuously being produced due to the continuous flow of fluid through conduit 16 and valve 18 except when a leak proof part 12 is sealingly connected. However, it is only important to determine whether the part 12 or work piece 12 has more leakage than is required or less leakage than is required. Therefore, the leakage flow rate is read at an instant within a fraction of a second after the work piece is sealingly connected to the leak tester. A signal to the computer circuitry calling for an instantaneous test reading can be provided from means 60. Signal 66 gives the position of the test piece or the work piece so that at the proper position along the assembly line, after the work piece is sealingly connected, a test of the flow rate will be made. In the preferred embodiment, a timing means such as the appropriate positioning of plate 62 causes a signal 66 to be generated which interrupts the pressure regulation function of the computer, shown schematically only in FIG. 2 as a test circuit 43b which in effect opens the circuit with signal 84 thereon and as a corresponding test circuit 43b which allows the flow rate signal 26 to be compared to the target flow rate signal 25. This embodiment acts as a timer means and permits a sufficient time for stabilization of the fluid flow through valve 18 prior to comparing the current or existing flow rate to the target flow rate. It has been found that this time period can be reduced to milliseconds or even to microseconds when the volume of conduit 16, connector tube 58, plate 52 and work piece 12 is sufficiently small. For example, in the case of a plastic aerosol spray trigger work piece and a leak tester constructed according to the present invention with distance from valve 18 to connector plate 52 of less than four inches (10.16 centimeters), the time delay may be less than approximately 10 milliseconds.

Upon receiving the instantaneous test signal the computer circuitry as shown in FIG. 2 activates comparator 44 to compare the received signal 26 with a target flow rate signal 25 from storage area 46. It will be understood that this storage area 46 may be updated or changed using standard computer storage means or using operator input from the keyboard to update the storage area target flow rate value. In the preferred embodiment the current or existing flow rate value and the target flow rate value will be transmitted to an operator readable display 90 for presentation there. If the comparator indicates that the current flow rate is within the target flow rate range then a "pass" signal 47 will also be generated for display and displayed on the CRT 90 or other operator readable display area 90. If the current flow rate is greater than the permissible flow rate or otherwise out of the permissible flow rate range then a "fail" signal 48 will be generated for display on the computer operator readable display area 90 such as a CRT 90.

In the preferred embodiment the computer will have circuitry 45 therein for generating, calculating, and recording statistics such as a counter for generating the number of work pieces tested, a counter for determining the number of work pieces which pass and the number of work pieces which fail. Also, quality percentages may be calculated from the foregoing statistics. All of such statistics may be recorded in memory storage for retrieval by the operator so that quality control standards may be monitored, maintained and improved.

In the preferred embodiment other items of interest to an operator may also be generated by the computer circuitry for display on the CRT 90 such as instructions for starting a series of tests, instructions for aborting the test, the condition of the pressure in tank 14 such as the target pressure and the current pressure.

By having all of this information available to the operator and in particular available in association with a computer terminal various other statistical calculations can be performed during and after testing.

It will further be understood by those skilled in the art that the signal indicating the "pass" or "fail" of the leak test can also be transmitted to appropriate assembly line machinery (not shown) which can remove the failed work pieces from the assembly line so that the integrity of the final product is maintained.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A computerized leak tester system for rapidly testing a work piece for fluid leaks comprising:
   a. a continuously regulated pressure supply;
   b. a valve having a continuously opened restrictive orifice therethrough for producing non-laminar flow;
   c. means for coupling said continuously regulated pressure supply to a test piece through said valve such that said work piece is both pressurized and tested through said valve;
   d. a differential pressure transducer connected across said valve for producing an analog signal in response to a differential pressure created by non-laminar fluid flow and detected across said valve;
   e. an analog to digital conversion means for receiving said signal from said differential pressure transducer and for converting it into a digital signal;
   f. a digital computer for receiving said digital signal representing said differential pressure value from said converter and for converting said differential pressure value into a flow rate value and for comparing said flow rate value to a predetermined flow rate value representing a maximum allowable leak rate.

2. The computerized leak tester system of claim 1 wherein said digital computer continuously regulates said continuously regulated pressure supply.

3. The leak tester of claim 1 further comprising:
   a. a high pressure air supply;
   b. fluid passage means connecting said high pressure fluid supply to said regulated pressure fluid supply tank;
   c. signal operated valve means interposed in said fluid passage means between said supply tank and said high pressure fluid supply;
   d. means for producing a digital signal representing the pressure in said supply tank;
   e. means in said digital computer for receiving said pressure signal;
   f. digital computer circuitry for comparing the signal representing the pressure in said supply tank to a predetermined target pressure; and
   g. computer circuitry means for signaling the signal operated valve means to open when the pressure in tank is below the predetermined target pressure and for closing said signal operated valve means when the pressure in said supply tank is above the target pressure.

4. The fluid leak tester of claim 3 further comprising:
   a. a bleed valve attached to said supply tank;
   b. circuitry means in said digital computer for opening said bleed valve when pressure in said supply tank is above a predetermined pressure and for closing said bleed valve when the pressure in said supply tank is below a predetermined pressure.

5. A leak tester for testing a work piece for fluid leaks comprising:
   a. a computer regulated pressure fluid supply tank including:
      i. a high pressure fluid supply;
      ii. fluid passage means connecting said high pressure fluid supply to said regulated pressure fluid supply tank;
      iii. signal operated valve means interposed in said fluid passage means between said supply tank and said high pressure fluid supply;
      iv. means for producing a signal representing the pressure in said supply tank;
      v. means in said computer for receiving said pressure signal;
      vi. computer circuitry for comparing the signal representing the pressure in said supply tank to a predetermined target pressure;
      vii. computer circuitry means for signalling the signal operated valve means to open when the pressure in tank is below the predetermined target pressure and for closing said signal operated valve means when the pressure in said supply tank is above the target pressure;
      viii. a bleed valve attached to said supply tank; and ix. circuitry means in said computer for opening said bleed valve when pressure in said supply tank is above a predetermined pressure and for closing said bleed valve when the pressure in said supply tank is below a predetermined pressure.

b. a single conduit for communicating pressurized fluid from said regulated fluid supply tank to said test piece;

c. fluid tight connector at one end of said single conduit for connecting said test piece thereto in a fluid tight manner;

d. a valve interposed in said single conduit means adjacent said fluid tight connector such that said test piece is chargeable with pressurized fluid through said valve and such that a differential pressure is created across said orifice valve when fluid flows therethrough;

e. a differential pressure transducer connected at two separate points in said single conduit upstream and downstream from said valve for producing an analog signal representing said differential pressure across said orifice;

f. computer circuitry for receiving said signal representing said pressure differential, for converting said signal into a flow rate value, for comparing said flow rate value to a range of acceptable leak rate values and for signaling the results of such comparison; and g. means for activating said computer circuitry only when a test piece has been connected to said conduit for a predetermined time period sufficient to fill an acceptably fluid tight work piece with pressurized fluid.

6. A leak tester for rapidly testing a work piece for fluid leaks comprising:

a. a supply tank;

b. computer operated means for maintaining said supply tank at a constant pressure, including a high pressure inlet valve opened by said computer when the tank pressure is below a predetermined level and closed when the tank pressure is above said predetermined level and a bleed valve closed by said computer when the tank pressure is below said predetermined pressure and opened when said tank pressure is above said predetermined pressure;

c. a single conduit leading from said supply tank to said test piece;

d. means for automatically and sealingly connecting said conduit to a test piece for testing and for automatically disconnecting said test piece after the test is completed;

e. means interposed in said conduit for producing a differential pressure when fluid flows therethrough;

f. means for measuring said differential pressure produced by said interposed means in said conduit;

g. computer means activatable for instantaneously reading said measured differential pressure, for converting said differential pressure into a leak rate value, for displaying said leak rate value, for comparing said leak rate value to a preselected range of acceptable leak rate values, for signaling whether or not said leak rate value was within said preselected range, and for recording said leak rate value and said preselected range for each work piece tested; and h. means for automatically activating said computer means for reading and converting said differential pressure for each test piece after said test piece is sealingly connected to said conduit and before it is disconnected.

7. The leak tester of claim 6 further comprising:

a. a high pressure air supply;

b. fluid passage means connecting said high pressure fluid supply to said supply tank;

c. signal operated valve means interposed in said fluid passage means between said supply tank and said high pressure fluid supply;

d. means for producing a digital signal representing the pressure in said supply tank;

e. means in said digital computer for receiving said pressure signal;

f. digital computer circuitry for comparing the signal representing the pressure in tank to a predetermined target pressure; and g. computer circuitry means for signaling the signal operated valve means to open when the pressure in tank is below the predetermined target pressure and for closing said signal operated valve means when the pressure in said supply tank is above the target pressure.

8. The fluid leak tester of claim 7 further comprising:

a. a bleed valve attached to said supply tank;

b. circuitry means in said digital computer for opening said bleed valve when pressure in said supply tank is above a predetermined pressure and for closing said bleed valve when the pressure in said supply tank is below a predetermined pressure.

9. A leak tester as in claim 6 wherein said means for automatically and sealingly connecting said conduit to a test piece and for automatically disconnecting said test piece further comprises:

a. a rigid plate correspondingly shaped for closing and opening in a test piece;

b. a resilient gasket on said plate correspondingly shaped for sealing said plate to said work piece;

c. a passage through said plate;

d. a fitting sealingly attached to said passage;

e. a flexible tube interconnecting said single conduit to said fitting;

f. means for sensing the position of a work piece in alignment with said plate and gasket;

g. means responsive to said sensing means for moving said gasket and plate into sealing engagement with the work piece when said work piece is adjacent thereto; and h. timing means for removing said plate and gasket from sealing engagement with said test piece after a predetermined period of time.

10. A leak tester as in claim 9 wherein said means for automatically activating said computer means for reading and converting said differential pressure comprises:

a. said work piece position sensing means;

b. a computer timer circuit for providing a delay time after said test piece is sealingly connected to said single conduit through said gasket plate and flexible hose; and c. timer circuitry for deactivating said computer means after said signal is read and converted by said computer.

11. A computerized leak tester for rapidly testing a test piece for fluid leaks comprising:

a. a high pressure source;

b. a supply tank;

c. a signal operated inlet valve interconnected between said high pressure source and said tank so that the flow pressurized air from the source to the tank can be alternately permitted and interrupted upon operating said inlet valve with an appropriate signal;

d. a signal operated bleed valve connected to said tank for releasing excess pressure therefrom upon receiving the appropriate signal;

e. a first pressure transducer means communication with said tank for producing an electrical analog signal representing the pressure in said tank;

f. an analog to digital converter having means for receiving said produced first analog signal and converting it to a computer readable first digital signal representing said pressure in said tank;

g. computer circuitry means for continuously receiving said computer readable first digital signal representing said tank pressure and for comparing it to a preselected narrow range of pressure values and for continuously producing a second digital signal to open or close said inlet valve and for continuously producing a third digital signal for opening or closing said bleed valve as required to continuously maintain the pressure in said tank within said preselected narrow range of pressure;

h. a conduit for continuously supplying a flow of pressurized air from said pressurized tank;

i. an adjustable flow restriction valve interposed in said conduit through which said pressurized air flows to produce a pressure drop across said adjustable valve which pressure drop is proportional to the volume of air flowing therethrough;

j. a second pressure transducer; responsive to differential pressure communicating with air in said conduit on either side of the restriction of said adjustable valve for producing a second analog signal representing the differential pressure across said adjustable valve;

k. means for receiving said second analog signal representing said differential pressure into said analog to digital converter for converting said second analog signal into a fourth digital signal representing said differential pressure and for transmitting said digital signal to a digital computer;

l. computer circuitry for converting said represented differential pressure into a current flow rate value and for comparing said flow rate value to a predetermined range of acceptable flow rate values and for signaling whether or not said current flow rate valve is within said acceptable range; .

m. human readable display means connected to said computer for displaying said current flow rate value, said predetermined range, and the results of said comparison;

n. means for automatically sealingly connecting said conduit having said adjustable valve interposed therein to a test piece; and o. means for instantaneously activating said computer circuitry after said conduit has been connected to said test piece a predetermined period of time.

12. A computerized leak tester system for rapidly testing a work piece for fluid leaks comprising a. a continuously regulated pressure supply including a high pressure inlet valve opened by said computer when the tank pressure is below a predetermined level and closed when the tank pressure is above said predetermined level and a bleed valve closed by said computer when the tank pressure is below said predetermined pressure and opened when said tank pressure is above said predetermined pressure;

b. a pressure differential valve;

c. means for coupling said continuously regulated pressure supply to a test piece through said valve such that said work piece is both pressurized and tested through said valve;

d. a differential pressure transducer connected across said valve for producing a signal representing a differential pressure detected across said valve;

e. a digital computer for receiving said signal representing said differential pressure value from said transducer and for converting said differential pressure value into a flow rate value and for comparing said flow rate value to a predetermined flow rate value representing a maximum allowable leak rate.

* * * * *